United States Patent [19]
Shinn

[11] 3,880,670
[45] Apr. 29, 1975

[54] ELECTROCHEMICAL CELL SEPARATOR PLATE MEANS

[75] Inventor: Byron H. Shinn, Ormond Beach, Fla.

[73] Assignee: United Aircraft Corporation, Hartford, Conn.

[22] Filed: July 2, 1973

[21] Appl. No.: 375,972

[52] U.S. Cl. ............................................. 136/86 R
[51] Int. Cl. ........................................... H01m 27/02
[58] Field of Search ....................................... 136/86

[56] References Cited
UNITED STATES PATENTS

| | | | |
|---|---|---|---|
| 3,428,492 | 2/1969 | Stankavich et al. | 136/86 R |
| 3,498,844 | 3/1970 | Sanderson | 136/86 R |
| 3,503,151 | 3/1970 | White | 136/86 R X |
| 3,507,702 | 4/1970 | Sanderson | 136/86 C |
| 3,761,316 | 9/1973 | Stedman | 136/86 E |

Primary Examiner—A. B. Curtis
Attorney, Agent, or Firm—Stephen E. Revis

[57] ABSTRACT

Separator plate means, disposed between two adjacent electrochemical cells, have a thin layer of electrically and thermally conductive material disposed on the surfaces thereof which are contiguous with the cells; the separator plate means forms gas compartments with each adjacent cell and includes coolant means therein; conducting means, such as pins, are disposed in the separator plate means for providing an electrical path from one cell, through the separator plate means, to the adjacent cell and for providing a heat conductive path from each of the cells to the coolant compartment.

5 Claims, 3 Drawing Figures

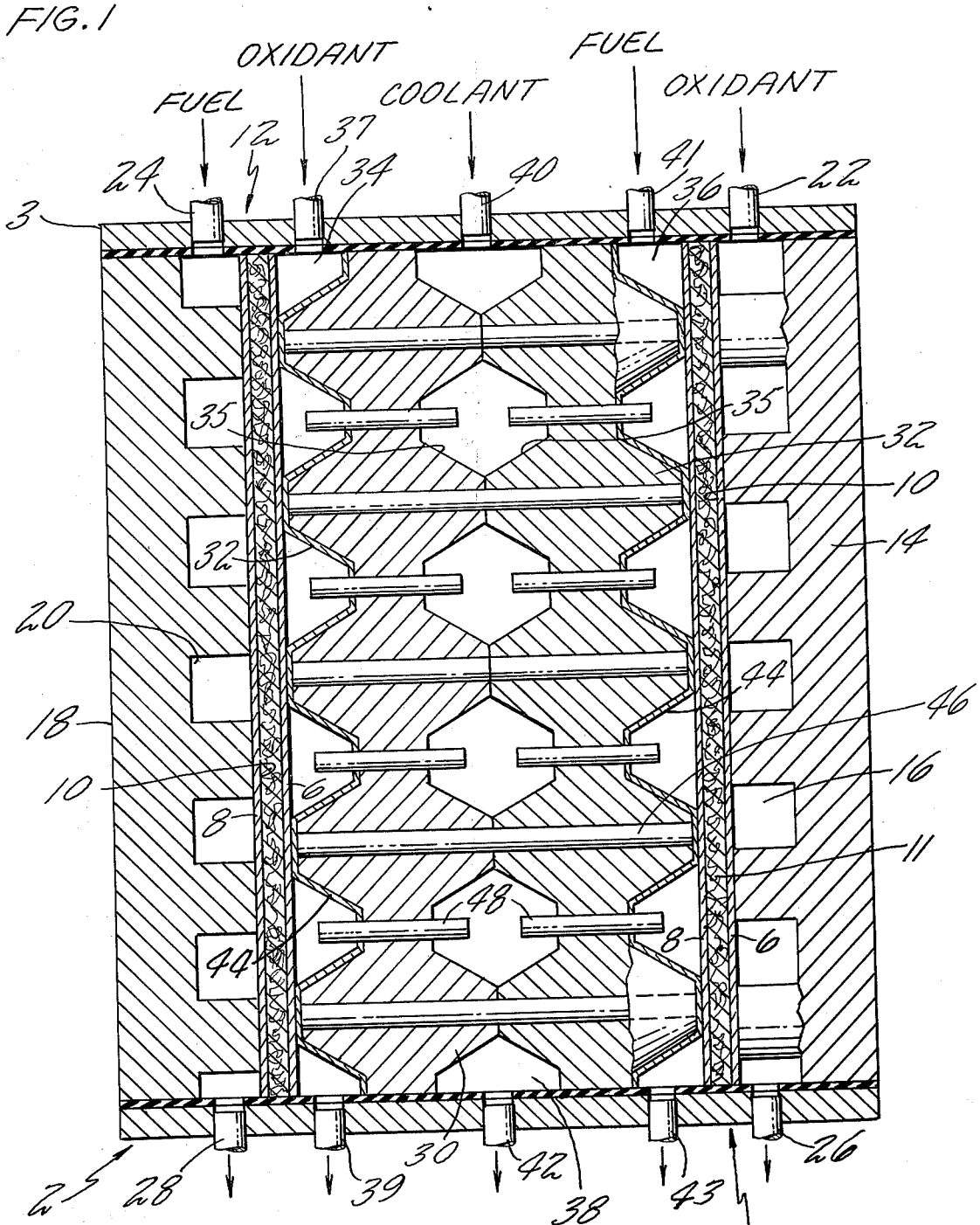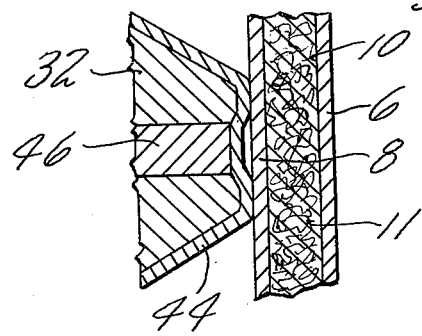

ELECTROCHEMICAL CELL SEPARATOR PLATE MEANS

BACKGROUND OF THE INVENTION

1. Field of the Invention

This invention relates to electrochemical cell construction and particularly to novel separator plate means for cells.

2. Description of the Prior Art

Separator plates for electrochemical cells known in the art are made from electrically and thermally conductive materials such as metals or carbon or graphite with or without a polymer binder, for example. These plates are heavy and relatively expensive to manufacture because of the particular requirements that flow passages must be provided therein and between separator plates and adjacent structures. My invention provides an inexpensive separator plate which is easily fabricated and which has the required thermal and electrical conductivities necessary in a separator plate for disposition adjacent electrochemical cells.

SUMMARY OF THE INVENTION

The object of the present invention is to provide a separator plate which is relatively inexpensive, easily fabricated and which has the desired thermal conductivity and electrical conductivity for successful utilization in electrochemical cells such as fuel cells.

In accordance with the present invention, the above and other objects and advantages are realized by separator plate means made of a polymer, which are disposed between two adjacent cells, the separator plate means having a thin layer of electrically and thermally conductive material disposed on the surfaces thereof which are contiguous with the cells; the separator plate means forms gas compartments with each adjacent fuel cell and includes coolant means; conducting means, such as pins, are disposed in the separator plate means for providing an electrical path from one cell, through the separator plate means, to the adjacent cell and for providing a heat conductive path from each of the cells to the coolant compartment.

BRIEF DESCRIPTION OF THE DRAWINGS

FIG. 1 is a sectioned view of a fuel cell including separator plate means according to the present invention.

FIG. 2 is a partial enlarged view of a portion of the separator plate means of FIG. 1 or FIG. 3.

DESCRIPTION OF THE PREFERRED EMBODIMENT

Figure 3:
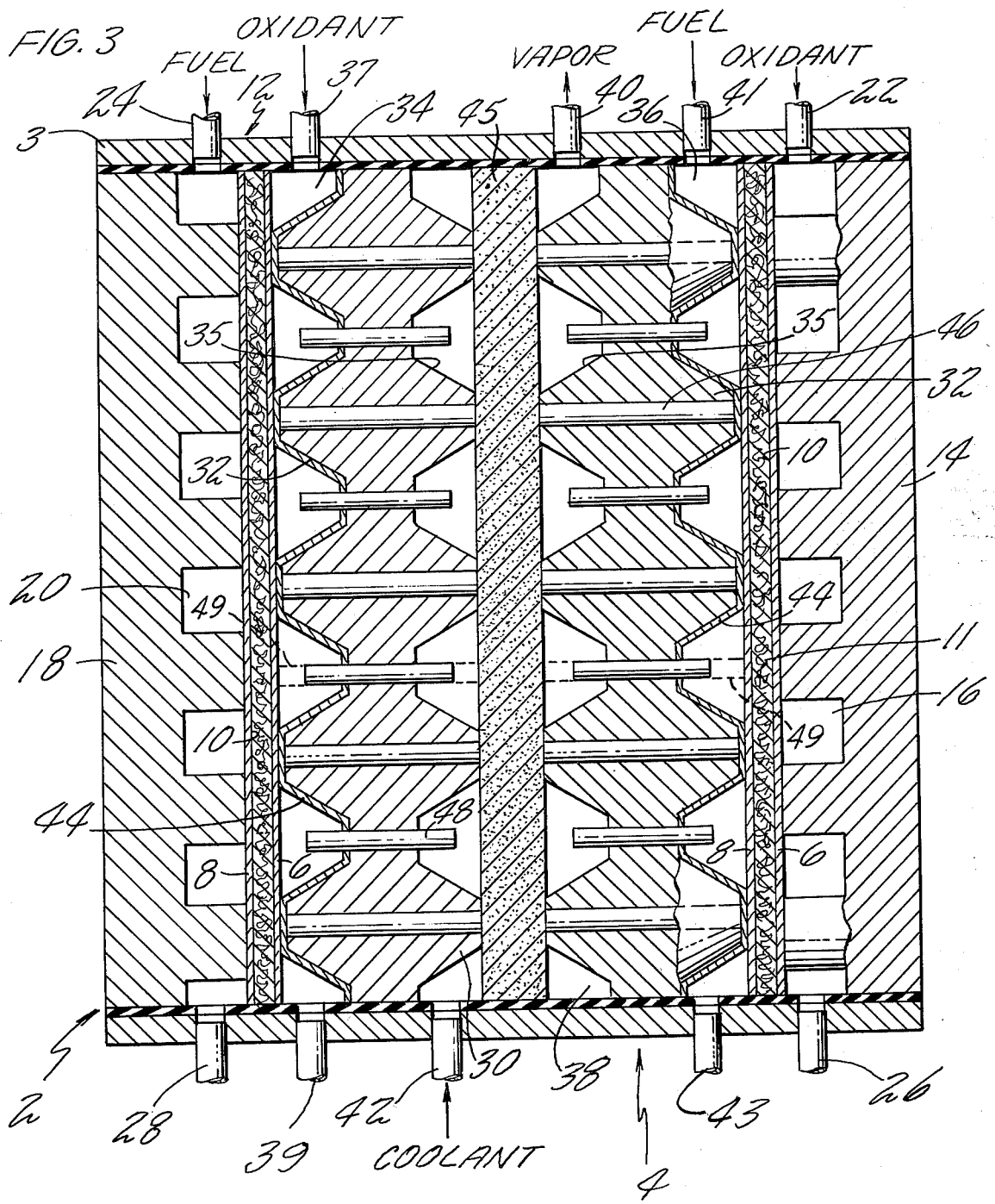
FIG. 3 is a sectioned view of another embodiment of a fuel cell including separator plate means according to the present invention.

Referring to FIG. 1, there is a fuel cell system shown generally by the numeral 2. A housing 3 encloses a first fuel cell 4, which includes a first reactant gas electrode, such as an oxidant electrode 6, a second reactant gas electrode, such as a fuel electrode 8, and an electrolyte compartment 10 (via inlets and outlets not shown). The electrolyte may circulate through the compartment 10, or the compartment may contain an electrolyte holding matrix 11, as is well known in the art. The housing 3 also encloses a second fuel cell 12, having a first reactant gas electrode, such as an oxidant electrode 6, a second reactant gas electrode, such as a fuel electrode 8, and an electrolyte compartment 10. End plate 14 forms a compartment 16 for a reactant gas, such as an oxidant gas, with electrode 6 of the first cell 4. End plate 18 forms a compartment 20 for a reactant gas, such as a fuel gas, with electrode 8 of the second cell 12. The compartment 16 is provided with an inlet 22 and the compartment 20 is provided with an inlet 24. The compartment may also have outlets if desired, 26 and 28 respectively. Separator plate means 30 are disposed between the electrode 8 of the first cell 4 and the electrode 6 of the second cell 12. It will be understood by those skilled in the art that either of the reactant gas electrodes (i.e., fuel or oxidant electrodes) may be adjacent the separator plate means on either side thereof, depending on the particular configuration desired, and that the particular arrangement shown is merely one embodiment of a fuel cell system utilizing my separator plate means 30. The separator plate means may be made of any of the various polymers, such as acrylonitrite-butadiene-styrene, polypropylene, polysulfone, polyphenylene sulfide, polytetrafluoroethylene and other polymers well known in the art. The separator plate means 30 has a series of projections 32 thereon which are in contiguous relationship with the electrodes 8 and 6 of cells 4 and 12, respectively. The projections may take any one of innumerable shapes, such as pins or ridges, for example, the only requirements being that they be in contiguous relationship with the adjacent electrodes, and that the projections 32 form, with the adjacent electrodes 6 and 8, reactant gas compartment 34 and a reactant gas compartment 36, respectively. The compartment 34 is provided with inlet 37 and outlet 39 if desired, while compartment 36 is provided with inlet 41 and outlet 43 if desired.

The separator plate means 30 also contains cooling means therein. The cooling means may take the form of a simple coolant compartment 38 having an inlet 40 and an outlet 42 for a coolant fluid as shown in FIG. 1, or it may contain additional means for cooling, such as an evaporative cooler means 45 shown in FIG. 3, wherein like numerals refer to like components. The evaporative cooler means 45 may be of a hydrophobic separator type, as is fully described in the U.S. patent to James K. Stedman No. 3,761,316 assigned to the assignee of the present invention. The evaporative cooler means 45 may also be of a hydrophilic separator type as fully described in U.S. Pat. No. 3,498,844.

A simple way of constructing the separator plate means 30 to form a coolant compartment 38 is to fabricate if from two separate plates as shown. The ends of the matching projections 35 on the inner surfaces of the separator plate means 30, are substantially contiguous with each other and form the coolant passage 38 around them. The separator plate means 30, of course, could be constructed of one piece with the coolant passage 38 provided in another manner such as by drilling the compartment in the plate, or by any other means well known in the art.

The surfaces of the separator plate means adjacent the electrodes 6 and 8 have a coating 44 disposed thereon which is thermally and electrically conductive. The electrically conductive coating 44 may be any metal, such as silver, nickel, copper, platinum, gold, palladium, etc. Nickel is preferred because of its good conductivity, resistance to corrosion and relative low cost. The coating may be disposed on the plate means by plating, spraying, dipping, brushing, or any other means well known in the art. Conducting means, which may be for example, pins 46, are disposed in the separator plate means 30, preferably in the raised projections 32 and 35, as seen best in FIG. 2. The pins 46 may be made of any material which is electrically conductive, such as a metal. Nickel is preferred. The pins may be cast in place, bonded in, pressed in, or otherwise disposed therein by any means known in the art.

It will be understood by those skilled in the art that the pins 46 need not be one piece all the way through the separator plate means 30 but may be of a two-piece construction for example, having one half in each portion of the separator plate means. If the hydrophobic separator or hydrophilic separator is electrically conductive, the pins 46 need not pass through the separator. For example, if the hydrophobic separator 45 were constructed from polytetrafluoroethylene impregnated porous metal, the pins 46 need not pass through, but merely extend between the surface of the separator 45 and the cell. However, if the separator is not electrically conductive, the pins 46 must pass therethrough. Heat conducting pins 48 are also disposed in the separator plate means 30; the pins 48 are placed so that they extend through at least a portion of the reactant gas cavity 34 or 36 into the coolant compartment 38, for the transfer of heat. The pins 48 may be cast in place, bonded in, pressed in or otherwise disposed therein, and may be made of any material which is thermally conductive, such as a metal. Nickel, again, is the preferred material.

It will be understood by those skilled in the art that the pins 48 may, in some cases, extend from one cell through the coolant means to the next cell. It is conceivable also to utilize the pins 48 both for thermal and electrical conduction and eliminate the pins 46 entirely by extending the pins 48 from one cell through the coolant means to the next adjacent cell. The phantom outlines in FIG. 2 at 49 illustrate this alternate construction for the pins 48. It can be seen that the pins 46 conduct electricity between the first cell 4 and the second cell 12, and that pins 48 conduct heat between reactant gas compartments 34 and 36 and coolant compartment 38. The coolant contemplated for use is one which is substantially nonconductive. Typical coolants are glycol and distilled water, although there are many others suitable for use.

There has thus been described separator plate means for use in electrochemical cells according to the present invention. Although the invention has been shown and described with respect to a preferred embodiment, it should be understood by those skilled in the art that various changes and omissions in the form and detail thereof may be made therein without departing from the spirit and scope of this invention, which is to be limited only as set forth in the following claims.

What I claim as novel and desire to secure by Letters Patent of the United States is:

1. An electrochemical cell system, comprising:

a housing;

a first cell in said housing including a first reactant gas electrode and a second reactant gas electrode, said first electrode being spaced from said second electrode by an electrolyte compartment;

a second cell in said housing including a first reactant gas electrode and a second reactant gas electrode, said first electrode being spaced from said second electrode by an electrolyte compartment;

polymer separator plate means disposed between said first cell and said second cell and being non-electrically and non-thermally conductive, said polymer separator plate means having a first surface adjacent said first cell and a second surface adjacent said second cell, said separator plate means forming a first reactant gas compartment with said first cell, and a second reactant gas compartment with said second cell, and said separator plate means further defining a coolant compartment therein having an inlet and outlet and being isolated from said first and second gas reactant compartments by said nonconductive polymer separator plate means;

a thin layer of electrically and thermally conductive material disposed upon said first surface and having at least a portion of said layer in contiguous relationship with said first cell;

a thin layer of electrically and thermally conductive material disposed upon said second surface and having at least a portion of said layer in contiguous relationship with said second cell; and pin means comprising a plurality of first pins disposed in said polymer separator plate means and extending from said coolant compartment to at least one of said reactant gas compartments for providing a thermal path therebetween, said pin means also providing an electrical path from said first cell to said second cell.

2. An electrochemical cell system as defined in claim 1, wherein said coolant compartment includes therein a hydrophobic separator type evaporative cooler.

3. An electrochemical cell system as defined in claim 1, wherein said coolant compartment includes therein a hydrophilic separator type evaporative cooler.

4. An electrochemical cell system as defined in claim 1, wherein said pin means comprises a plurality of second pins disposed in said separator plate means, said second pins extending from said first cell to said second cell for providing an electrical path therebetween.

5. An electrochemical cell system as defined in claim 1 wherein at least one of said first pins extends from said first cell to said second cell and provides said electrical path between said cells.

\* \* \* \* \*